United States Patent
Junichi et al.

[11] Patent Number: 6,040,007
[45] Date of Patent: Mar. 21, 2000

[54] NICKEL HYDROXIDE PARTICLES HAVING AN α- OR β-COBALT HYDROXIDE COATING LAYER FOR USE IN ALKALI BATTERIES AND A PROCESS FOR PRODUCING THE NICKEL HYDROXIDE

[75] Inventors: Imaizumi Junichi; Kawasaki Yuri; Makino Tetsushi; Iida Toyoshi, all of Fukui-ken, Japan

[73] Assignee: Tanaka Chemical Corporation, Fukui, Japan

[21] Appl. No.: 08/858,599

[22] Filed: May 19, 1997

[30] Foreign Application Priority Data

Jun. 19, 1996 [JP] Japan ................................. 8-178522
Jun. 19, 1996 [JP] Japan ................................. 8-178523

[51] Int. Cl.⁷ ............................................. B05D 7/00
[52] U.S. Cl. ......................... 427/215; 427/212; 428/403
[58] Field of Search ................... 428/403, 404, 428/469, 472, 546, 547, 548, 567, 639, 640, 402; 427/212, 215; 429/27, 40, 209, 218, 223

[56] References Cited

U.S. PATENT DOCUMENTS

| | | | |
|---|---|---|---|
| 4,844,999 | 7/1989 | Oshitami et al. | 429/223 |
| 5,571,636 | 11/1996 | Ohta et al. | 429/218 |
| 5,629,111 | 5/1997 | Yamawaki et al. | 429/223 |
| 5,660,952 | 8/1997 | Yano et al. | 429/223 |
| 5,691,086 | 11/1997 | Baba et al. | 429/218 |
| 5,700,596 | 12/1997 | Ikoma et al. | 429/206 |
| 5,707,764 | 1/1998 | Miyamoto et al. | 429/223 |
| 5,708,349 | 1/1998 | Hasebe et al. | 320/21 |
| 5,744,259 | 4/1998 | Ohta et al. | 429/59 |
| 5,773,169 | 6/1998 | Matsuda et al. | 429/223 |
| 5,827,494 | 10/1998 | Yano et al. | 423/594 |

FOREIGN PATENT DOCUMENTS

| | | |
|---|---|---|
| 63-152866 | 6/1988 | Japan . |
| 7-235303 | 9/1995 | Japan . |
| 7-320733 | 12/1995 | Japan . |
| 7-320736 | 12/1995 | Japan . |
| 7-320737 | 12/1995 | Japan . |

*Primary Examiner*—Paul Thibodeau
*Assistant Examiner*—Sheeba Ahmed
*Attorney, Agent, or Firm*—Pennie & Edmonds LLP

[57] ABSTRACT

High-density nickel powders are produced by forming an α- or β-cobalt hydroxide layer on the surfaces of and within pores of nickel hydroxide particles. The coated nickel hydroxide particles feature enhanced utilization as the positive electrode active material in alkali batteries and enable the capacity of the positive electrode to be increased.

2 Claims, 2 Drawing Sheets

NICKEL HYDROXIDE PARTICLES HAVING AN α- OR β-COBALT HYDROXIDE COATING LAYER FOR USE IN ALKALI BATTERIES AND A PROCESS FOR PRODUCING THE NICKEL HYDROXIDE

BACKGROUND OF THE INVENTION

1. Field of the Invention

This invention relates to a process for producing high-density nickel hydroxide for use as a positive electrode active material in alkali batteries that employ cadmium, zinc and other hydrogen-absorbing alloys at the negative electrode.

2. Description of the Prior Art

With the recent efforts toward adding higher value to portable electronic devices, it has become necessary to use batteries having increased capacity. With alkali batteries, this requirement can be met by enhancing the utilization of the nickel hydroxide powder which is used as the active material in a nickel paste positive plate. The addition of cobalt hydroxide has been proposed as a method of insuring electrical conductivity between nickel hydroxide particles to thereby enhance their utilization. In fact, however, cobalt hydroxide is distributed so unevenly in the paste that it has to be used in an increased amount in order to realize uniform dispersion; but then the loading of nickel hydroxide decreases and the drop in battery's capacity is unavoidable. It is known to add cobalt monoxide for the same purpose but it is generally held that the fabricated battery does not have satisfactory discharge performance on account of the formation of $Co_3O_4$ which contributes in no way to improve the utilization of nickel hydroxide particles.

Under the circumstances, it has been proposed that electrical conductivity be insured between nickel hydroxide particles to enhance their utilization by coating the surfaces of the nickel hydroxide particles with cobalt hydroxide in one of the following manners:

1) To obtain a uniform cobalt oxyhydroxide layer within a liquid electrolyte, the cobalt hydroxide is not directly mixed with nickel hydroxide. Instead, the particles of nickel hydroxide are first impregnated in a cobalt salt solution and reacted with sodium hydroxide to form a β-cobalt hydroxide coating layer on the surfaces of the nickel hydroxide particles (see Japanese Patent Public Disclosure No. 152866/1988);

2) the particles of nickel hydroxide are immersed in a cobalt salt solution and reacted with an alkali hydroxide at a controlled pH, thereby forming cobalt hydroxide layer on the surfaces of the nickel hydroxide particles; in order to compensate for the cracks that will develop in the cobalt hydroxide coating layer during the pressing of the electrode plate, elemental Co or a Co compound is added, thereby forming a conductive network in the liquid electrolyte (see Japanese Patent Public Disclosure No. 235303/1995);

3) the particles of nickel hydroxide are immersed in a solution having a cobalt salt dissolved in a mixture of water and ethyl alcohol and the nickel hydroxide is reacted with sodium hydroxide under agitation at a pH of 9, whereby the surfaces of the nickel hydroxide particles are coated with specified proportions of α- and β-forms of cobalt hydroxide (see Japanese Patent Public Disclosure No. 320733/1995);

4) by the same method as taught in Japanese Patent Public Disclosure No. 320733/1995, the surfaces of nickel hydroxide particles are coated with cobalt hydroxide to provide a bulk density which is at least 85% of the bulk density of the nickel hydroxide used as the base material (see Japanese Patent Public Disclosure No. 320736/1995); and 5) nickel hydroxide particles are coated with two layers of cobalt hydroxide, the inner layer being made of α- cobalt hydroxide and the outer layer of β-cobalt hydroxide (see Japanese Patent Public Disclosure No. 320737/1995).

However, these methods have their problems. In the first method which solely relies upon the increased pH, a sufficiently uniform coating layer of cobalt hydroxide is not formed to permit satisfactory utilization of the nickel hydroxide particles. The second method is somewhat improved over the first method since it keeps the pH at a fixed value. But, on the other hand, the direct coating with a β-form of cobalt hydroxide is not capable of forming a uniform coating layer of cobalt hydroxide. In addition, incorporating elemental Co or a Co compound is not a complete solution to the cracking problem. On the contrary, it adds an extra step and increases the process cost. The third method involves difficulty in controlling the proportions of the two different forms of cobalt hydroxide and, in addition, the use of the organic solvent adds to the cost of effluent treatment. In the fourth method, the bulk density of the coated nickel hydroxide particles is insufficient to prevent the decrease in positive capacity. In the fifth method, the coating layer of cobalt hydroxide is not sufficiently uniform to permit satisfactory utilization of the nickel hydroxide particles.

Thus, the cobalt hydroxide coated nickel hydroxide particles produced by the above-described conventional processes have not been completely satisfactory for use in the positive plate of alkali batteries.

An object, therefore of the present invention is to solve the aforementioned problems of the prior art by providing a high-density nickel hydroxide powder that comprises high-density nickel hydroxide particles coated with an α- or β-cobalt hydroxide layer and which permits efficient utilization.

SUMMARY OF THE INVENTION

The high-density nickel hydroxide to be used as a positive electrode active material in an alkali battery according to an aspect of the invention is characterized in that the spherical particles of the nickel hydroxide powder serve as a base and are covered with an α-cobalt hydroxide layer on the surface and within pores thereof. Said particles are spherical or nearly spherical and have 1–10% cobalt coating, a tapping density of at least 1.6 g/cc, a half-width of 0.8–1.3 degrees/2θ for peaks of a (101) face in X-ray diffraction, a specific surface area of 0.5–30 $m^2/g$ and an average grain size of 3–25 μm. The nickel hydroxide having these characteristics can be produced by a process comprising the steps of supplying an aqueous solution of a nickel salt, an ammonium ion source and a solution of an alkali metal hydroxide continuously into a reaction vessel, causing a continuous crystal growth of high-density spherical nickel hydroxide, recovering the resulting high-density spherical nickel hydroxide either continuously or intermittently, charging said high-density spherical nickel hydroxide into another reaction vessel, then adding an ammonium ion source and a solution of an alkali metal hydroxide, adjusting the pH of the reaction mixture to 8–11, and adding an aqueous solution of a cobalt salt and a solution of an alkali metal hydroxide with the pH maintained at the adjusted value, thereby forming an α-cobalt hydroxide layer on the surfaces of the nickel hydroxide particles.

The nickel hydroxide to be used as a positive electrode active material in an alkali battery according to another aspect of the invention is characterized in that the spherical particles of the nickel hydroxide powder serve as a base are covered with a β-cobalt hydroxide layer on the surface and within pores thereof, said particles are spherical or nearly spherical and have 1–10% cobalt coating, a tapping density of at least 1.9 g/cc, a half-width of 0.8–1.3 degrees/2θ for peaks of a (101) face in X-ray diffraction, a specific surface area of 0.5–30m²/g and an average grain size of 3–25 μm. The nickel hydroxide having these characteristics can be produced by a process comprising the steps of supplying an aqueous solution of a nickel salt, an ammonium ion source and a solution of an alkali metal hydroxide continuously into a reaction vessel, causing a continuous crystal growth of high-density spherical nickel hydroxide, recovering the resulting high-density spherical nickel hydroxide either continuously or intermittently, charging said high-density spherical nickel hydroxide into another reaction vessel, then adding an ammonium ion source and a solution of an alkali metal hydroxide, adjusting the pH of the reaction mixture to 8–11, adding an aqueous solution of a cobalt salt and a solution of an alkali metal hydroxide with the pH maintained at the adjusted value to thereby form an α-cobalt hydroxide layer on the surfaces of the nickel hydroxide particles, supplying an additional amount of the solution of an alkali metal hydroxide and stirring the reaction mixture at a controlled pH of 11–13.5, thereby forming a coating layer of β-cobalt hydroxide which has been converted from the α-form.

When forming the cobalt hydroxide coating layer, the coating operation is preferably performed under a nitrogen-filled condition and/or under nitrogen bubbling.

DETAILED DESCRIPTION OF THE INVENTION

Figure 1:
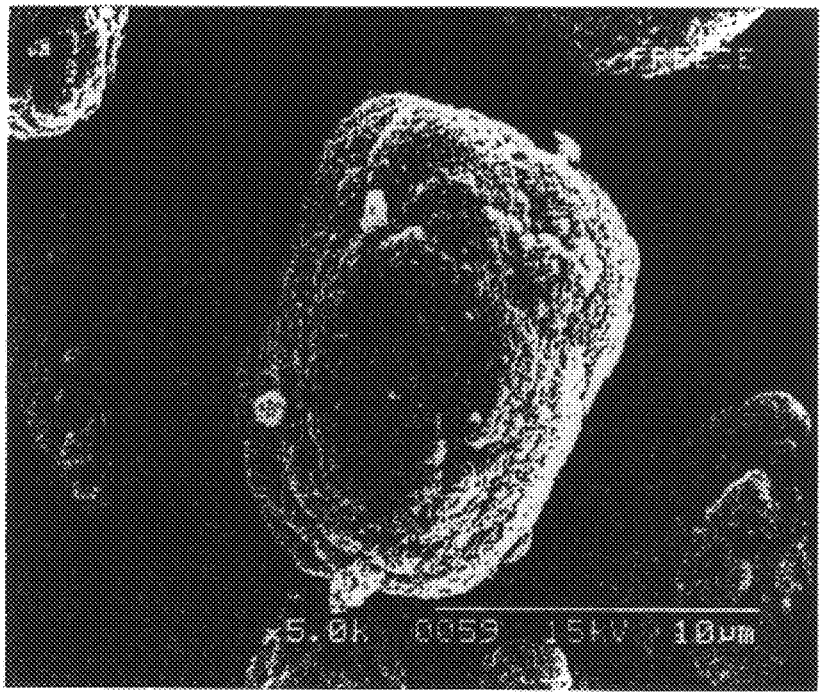
FIG. 1 is an electron micrograph showing the surface structure of a nickel hydroxide crystal as the coating base used in Example 1.
Figure 2:
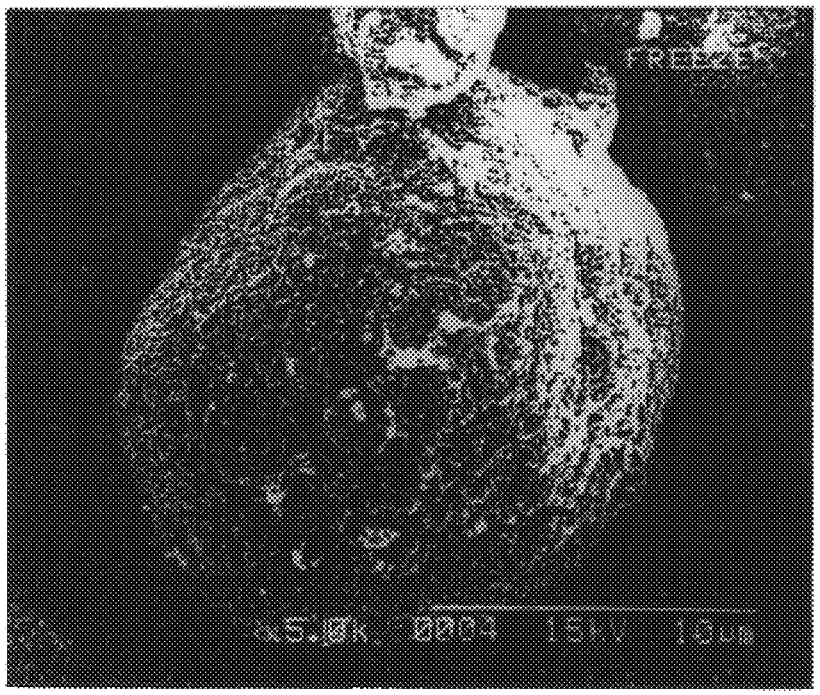
FIG. 2 is an electron micrograph showing the surface of a nickel hydroxide crystal having the α-cobalt hydroxide coating layer formed in Example 1.
Figure 3:
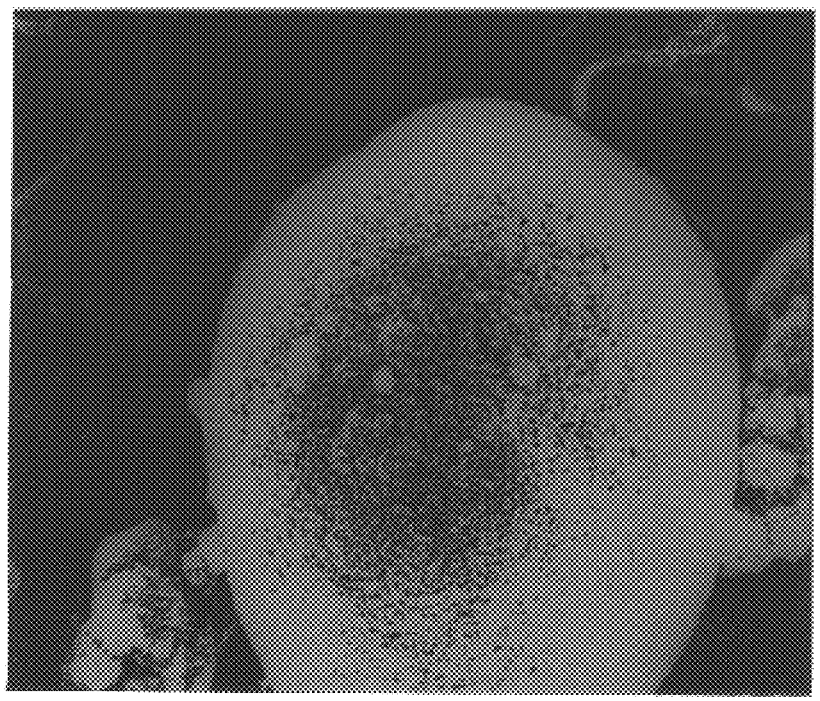
FIG. 3 is an electron micrograph showing the surface structure of a nickel hydroxide crystal as the coating base used in Example 4.
Figure 4:
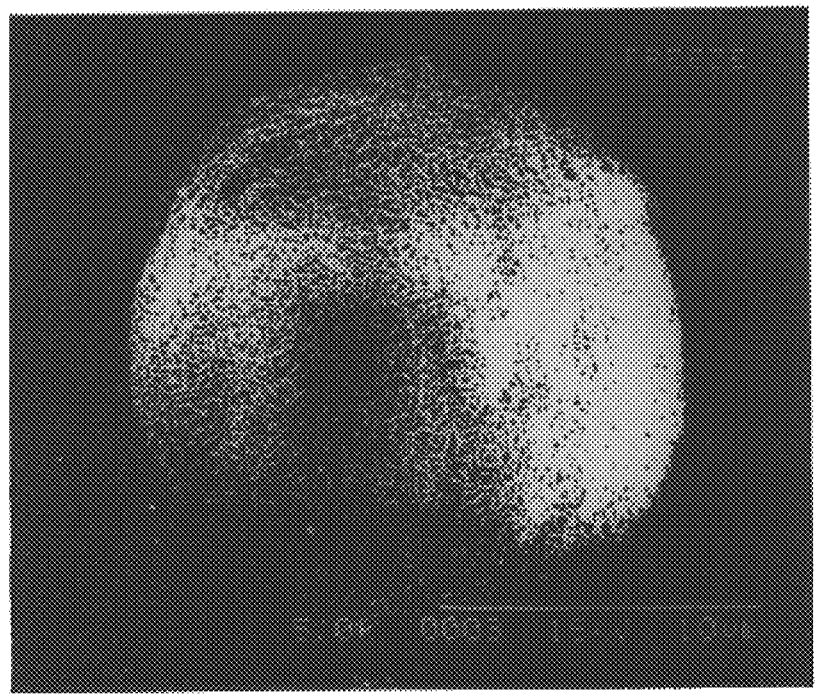
FIG. 4 is an electron micrograph showing the surface structure of a nickel hydroxide crystal having the β-cobalt hydroxide coating layer formed in Example 4.

We first describe the high-density nickel hydroxide which is used as a base to form the cobalt hydroxide coating layer on the surface and within pores. When solid crystals are to precipitate from an aqueous solution, more grains will generally crystallize out with increasing concentration gradient. An aqueous solution will precipitate solid crystals after passing through the following stages in sequence: quasi-saturation, saturation and supersaturation. In order to grow crystal grains, the aqueous solution must pass through the three stages as slowly as possible and to this end, the concentration gradient near the saturated state has to be small enough. However, the solubility curve of nickel hydroxide is very sensitive to pH; in other words, the pH dependent concentration gradient of nickel in aqueous solution is very steep. Therefore, only fine grains can be produced if ordinary crystal growth techniques are employed.

In the present invention, nickel is converted to an ammonium complex salt, whereby the pH dependent concentration gradient of nickel in aqueous solution is made sufficiently small to achieve satisfactory crystal growth. Supplying constant amounts of the three ingredients (i.e., nickel salt, ammonium ion and alkali metal hydroxide) and controlling the pH of the mixture is simply incapable of preventing the concentration of ammonium ions in the solution from varying due to the decomposition and evaporation of ammonia and the formation of crystal nuclei from the ammonium complex salt becomes labile. Only when the concentration of ammonium ions in the solution is controlled does the formation of crystal nuclei become consistent enough to achieve uniform grain growth. This is the mechanism behind the production of high-density nickel hydroxide in the present invention.

In order to maintain this mechanism, the ammonium ion source and the solution of an alkali metal hydroxide must always be present in such amounts as to provide the required nickel yield and, therefore a continuous reaction is employed in the invention. The agitation performed in the process causes individual grains to grind each other and the repeated grinding and crystal growth will lead to the formation of flowable spherical nickel hydroxide particles. Therefore, the rate of agitation is also an important factor in the invention. As shown by reaction formulae (1) and (2) set forth below, the ammonium ion source is used as a catalyst in the reaction to be performed in the invention. The reaction formulae refer to the case where nickel sulfate, ammonia and sodium hydroxide are used as the nickel salt, ammonium ion source and the solution of an alkali metal hydroxide, resectively.

(1) $NiSO_4 + 4NH_3 + 2NaOH \rightarrow Ni(NH_3)_4(OH)_2 + Na_2SO_4$ (1)

(2) $Ni(NH_3)_4(OH)_2 \rightarrow Ni(OH)_2 + 4NH_3$ (2)

Obviously, ammonia need not be used in more than 4 equivalent amounts and in practice a small amount of about 0.5 equivalents will suffice. If ammonium sulfate is used as the ammonium ion source, a salt effect is expected and nickel hydroxide of an even higher density can be produced. Other examples of the useful ammonium ion source include ammonium chloride, ammonium carbonate and ammonium fluoride.

We next describe the coating with cobalt hydroxide. The reason for covering the surfaces of nickel hydroxide particles with a cobalt hydroxide layer is that upon charging, the efficient coverage of cobalt hydroxide is converted to highly conductive cobalt oxyhydroxide, whereby a current collecting network is created at the nickel electrode to improve the utilization of the nickel hydroxide.

In addition, the use of a complexing agent such as ammonium ion ensures that α-cobalt hydroxide can be formed at a pH of 8–11, rather than at 5–8 which has been commonly used in the prior art. By increasing the α-cobalt hydroxide forming pH, the pH imbalance which would otherwise occur within the reaction vessel upon addition of the solution of an alkali metal hydroxide can be effectively eliminated to permit consistent formation of α-cobalt hydroxide.

In order to form the α-cobalt hydroxide layer, the high-density spherical nickel hydroxide particles are charged into a reaction vessel, then an ammonium ion source and an alkali metal hydroxide are added to adjust the pH to between 8 and 11, and with the pH maintained at the same value, an aqueous solution of a cobalt salt and an alkali metal hydroxide are added such as to form a uniform α-cobalt hydroxide layer on the surfaces of the nickel hydroxide particles. Desirably, the reaction system is held for 10 min–2 h at the stated pH between 8 and 11.

In order to form a β-cobalt hydroxide layer, an alkali metal hydroxide is supplied in a subsequent step and the mixture is stirred at a pH of 11–13.5, whereupon the α-cobalt hydroxide on the surfaces of the nickel hydroxide particles is converted to β-cobalt hydroxide, thereby forming a uniform β-cobalt hydroxide layer. The reaction mixture is desirably stirred at the stated pH for 5 min–3 h.

If the β-cobalt hydroxide coating layer thus formed is oxidized to more conductive cobalt oxyhydroxide, the nickel hydroxide can be allowed to function more efficiently as a positive electrode active material. Typical oxidation methods include electrochemical oxidation, chemical oxidation with hypochlorites or persulfates, and oxidation by heating a mixture with a liquid alkali.

The criticalities of the numerical limitations on the physical properties of the nickel hydroxide for use in alkali batteries according to the invention are as follows:

(1) Amount of cobalt coating

If the amount of cobalt coating is less than 1%, the addition of cobalt is not at all effective in enhancing the utilization of nickel hydroxide. If the amount of cobalt coating is greater than 10%, uniform coating cannot be achieved and more of the applied cobalt hydroxide becomes free.

(2) Tapping density

If the tapping density of the nickel hydroxide powder is smaller or than 1.6 g/cc (in the case where the coating layer is made of α-cobalt hydroxide) or 1.9 g/cc (in the case where the coating layer is made of β-cobalt hydroxide), the loading of the nickel hydroxide powder that can be achieved is so small that the resulting positive electrode will have a reduced capacity.

(3) Half-width of peaks for a (101) face in X-ray diffraction

If the half-width of peaks for a (101) face is less than 0.8 degrees/2θ, protons will not move about freely in the liquid electrolyte. Beyond 1.3 degrees/2θ, the crystallinity of the nickel hydroxide particles deteriorates to such an extent that they are no longer spherical and can only be loaded in a smaller quantity.

(4) Specific surface area

If the specific surface area of the nickel hydroxide particles is less than 0.5 $m^2/g$, an increasing amount of macro-particles will occur to deteriorate the flowability of the nickel hydroxide powder, thereby reducing its loading in a positive plate. Beyond 30 $m^2/g$, the volume of voids in the nickel hydroxide particles will increase to reduce their density.

(5) Average grain size

If the average grain size of the nickel hydroxide particles is less than 3 μm, an increasing amount of fine particles will occur to deteriorate the flowability of the nickel hydroxide powder, thereby reducing its loading in a positive plate. Beyond 25 μm, an increasing amount of macro-particles will occur to deteriorate the flowability of the nickel hydroxide powder, thereby reducing its loading in a positive plate.

The high-density nickel hydroxide for use as a base may contain dissimilar elements selected from among Co, Zn, Ca, Mg, Al, Mn, Cu and Ti; at least one of these elements may be dissolved in the high-density nickel hydroxide.

The following examples are provided for the purpose of further illustrating the present invention but are in no way to be taken as limiting.

EXAMPLES

Example 1

A reaction vessel equipped with a stirrer was charged continuously with an aqueous solution of nickel sulfate (2 mol/L) and an aqueous solution of ammonium sulfate (5 mol/L); at the same time, a solution of sodium hydroxide (10 mol/L) was charged in such an amount that the pH in the reactor was automatically maintained at 12.0. The temperature in the reactor was maintained at 40° C. under constant agitation with the stirrer. The resulting hydroxide was recovered via an overflow pipe, washed with water, dehydrated and dried to yield a high-density nickel hydroxide powder.

A hundred grams of the high-density nickel hydroxide powder was charged into a 2-L reaction vessel equipped with a stirrer. Thereafter, an aqueous solution of ammonium sulfate (5 mol/L) and an aqueous solution of sodium hydroxide (10 mol/L) were added to adjust the pH to 9, and an aqueous solution of cobalt sulfate (2 mol/L; 40 mL) and an aqueous solution of sodium hydroxide (10 mol/L) were added such as to maintain the pH 9, and the resulting mixture was held for 30 min. By subsequent filtration, dehydration and drying, nickel hydroxide particle having an α-cobalt hydroxide coating layer were produced. The amount of cobalt coating was 4.4%.

Example 2

The procedure of Example 1 was repeated, except that 5% Zn and 1% Co were dissolved in the base nickel hydroxide.

Example 3

The procedure of Example 1 was repeated, except that the coating with α-cobalt nickel was performed at a pH of 10.

Comparative Example 1

The procedure of Example 1 was repeated, except that the coating step was performed at a pH of 12 such that a β-cobalt nickel coating layer was directly formed.

Comparative Example 2

The procedure of Example 1 was repeated, except that an aqueous solution of cobalt sulfate (2 mol/L) was used in an amount of 9 mL to give a cobalt coating of 0.8%.

Comparative Example 3

The procedure of Example 1 was repeated, except that an aqueous solution of cobalt sulfate (2 mol/L) was used in an amount of 110 mL to give a cobalt coating of 11.5%.

Example 4

A reaction vessel equipped with a stirrer was charged continuously with an aqueous solution of nickel sulfate (2 mol/L) and an aqueous solution of ammonium sulfate (5 mol/L); at the same time, a solution of sodium hydroxide (10 mol/L) was charged in such an amount that the pH in the reactor was automatically maintained at 12.0. The temperature in the reactor was maintained at 40° C. under constant agitation with the stirrer. The resulting hydroxide was recovered via an overflow pipe, washed with water, dehydrated and died to yield a high-density nickel hydroxide powder.

A hundred grams of the high-density nickel hydroxide powder was charged into a 2-L reaction vessel equipped with a stirrer. Thereafter, an aqueous solution of ammonium sulfate (5 mol/L) and an aqueous solution of sodium hydroxide (10 mol/L) were added to adjust the pH to 9, and an aqueous solution of cobalt sulfate (2 mol/L; 40 mL) and an aqueous solution of sodium hydroxide (10 mol/L) were added such as to maintain the pH 9, and the resulting mixture was held for 30 min. Thereafter an aqueous solution of sodium hydroxide (10 mol/L) was added in such an amount as to adjust the pH to 12.5 and the reaction mixture was held at that pH for 1 h. By subsequent filtration, dehydration and drying, nickel hydroxide particles having a β-cobalt hydroxide coating layer were produced. The amount of cobalt coating was 4.4%.

Example 5

The procedure of Example 4 was repeated, except that 5% Zn and 1% Co were dissolved in the base nickel hydroxide.

Example 6

The procedure of Example 4 was repeated, except that the coating with α-cobalt nickel was performed at a pH of 10 and that the conversion from the α- to β-form was effected at a pH of 13.

Comparative Example 4

The procedure of Example 4 was repeated, except that the coating step was performed at a pH of 12 such that a β-cobalt nickel coating layer was directly formed.

Comparative Example 5

The procedure of Example 4 was repeated, except that an aqueous solution of cobalt sulfate (2 mol/L) was used in an amount of 15 mL to give a cobalt coating of 1.5%.

Comparative Example 6

The procedure of Example 4 was repeated, except that an aqueous solution of cobalt sulfate (2 mol/L) was used in an amount of 9 mL to give a cobalt coating of 0.8%.

The coated nickel hydroxide samples were measured for various physical properties by the methods described below. The result are shown in Table 1. Cobalt content was measured by ICP with SPS7000S of Seiko Denshi K.K.

Tapping Density

Using SEISINN TAPDENSER KYT3000, the weight of a 20-cc cell was measured and designated (A). Each sample was passed through a 480-mesh screen to drop under gravity into the cell until it was filled with the sample. After 200 tappings, the weight of the cell was measured and designated (B). The filling capacity of the cell was also measured and designated (C). The tapping density of the sample was calculated by (B−A)/C.

Half-Width

Peaks for a (101) face were subjected to X-ray diffraction (38.4 degrees) with RINT 200 (product of Rigaku K.K.)

Specific Surface Area

With nitrogen used as an adsorbent, a desorption isotherm was constructed with "AUTOSORB 1" of Quanterchrome Co.

Average Grain Size

Using a particle size distribution analyzer (LA910 of Horiba, Ltd.), grain size measurement was conducted by the laser method and a value corresponding to cumulative 50% was determined.

TABLE 1

|  |  | Crystal shape | Tapping density, cc/g | Half-width for (101) face, deg | Specific surface area, $m^2/g$ | Average grain size, $\mu$ |
|---|---|---|---|---|---|---|
| Example | 1 | spherical | 2.01 | 0.884 | 10.6 | 8.4 |
|  | 2 | spherical | 1.80 | 1.000 | 1.3 | 14.4 |
|  | 3 | spherical | 1.71 | 0.907 | 2.7 | 12.0 |
| Comparative | 1 | warty | 1.83 | 1.056 | 6.3 | 10.5 |
| Example | 2 | spherical | 1.98 | 1.156 | 9.6 | 12.5 |
|  | 3 | fine grains predominant | 1.55 | 0.989 | 3.6 | 9.9 |
| Example | 4 | spherical | 2.18 | 1.045 | 7.2 | 13.4 |
| Example | 5 | spherical | 2.14 | 1.059 | 6.7 | 9.9 |
| Example | 6 | spherical | 2.04 | 0.959 | 2.4 | 10.9 |
| Comparative | 4 | warty | 1.83 | 1.056 | 6.3 | 10.5 |
| Example | 5 | spherical | 2.09 | 0.985 | 8.4 | 11.3 |
|  | 6 | fine grains predominant | 1.85 | 0.919 | 10.1 | 9.8 |

Evaluation of Cell Performance

Using the coated nickel hydroxide samples prepared in Examples 1–6 and Comparative Examples 1–6, positive electrodes were fabricated by the following procedure: first, the nickel hydroxide powder was mixed with a minor amount of a cobalt monoxide powder; an aqueous solution of CMC (carboxymethyl cellulose) was added to the mixture, which was processed into a paste, packed onto a foamed nickel substrate, dried and press formed into a positive electrode. A cell consisting of this positive electrode and a cadmium negative electrode was cyclically charged and discharged in an aqueous solution of potassium hydroxide in order to determine the percent utilization of the positive electrode active material and the cycle life.

The percent utilization of the positive electrode active material was determined by the following method: the cell was charged to 150% of the theoretical capacity of the positive electrode at a charging current of 0.1 C, then discharged to 1.0 volts at a discharge current of ⅕ C, and the cell capacity after that discharge was divided by the theoretical capacity of nickel hydroxide and the quotient was multiplied by 100 to give the percent rated utilization of the positive electrode active material. The results are shown in Table 2 (for the coating with α-cobalt hydroxide layer) and Table 3 (for the coating with β-cobalt hydroxide layer).

TABLE 2

|  |  | Percent utilization |
|---|---|---|
| Example | 1 | 99 |
|  | 2 | 99 |
|  | 3 | 98 |
| Comparative | 1 | 92 |
| Example | 2 | 90 |
|  | 3 | 95 |

TABLE 3

|  |  | Percent utilization |
|---|---|---|
| Example | 4 | 99 |
|  | 5 | 98 |
|  | 6 | 96 |
| Comparative | 4 | 92 |
| Example | 5 | 89 |
|  | 6 | 93 |

As is clear from the foregoing explanation and data, the present invention provides high-density nickel hydroxide powders that feature high utilization in pasted nickel positive electrodes in alkali batteries and, hence, it offers great benefits in industrial applications.

What is claimed is:

1. A process for producing an active material for positive electrodes of alkali batteries, comprising the following steps:

(1) supplying an aqueous solution of a nickel salt, an ammonium ion source and a solution of an alkali metal hydroxide into a reaction vessel;

(2) causing a continuous crystal growth of high-density nickel hydroxide;

(3) recovering the resultant nickel hydroxide particles and supplying them into another reaction vessel;

(4) adding an ammonium ion source and a solution of an alkali metal hydroxide and adjusting the pH to 8–11; and (5) adding an aqueous solution of a cobalt salt and a solution of an alkali metal hydroxide while maintaining the pH value, thereby forming an α-cobalt hydroxide coating layer on the surface and within pores of said nickel hydroxide particles.

2. A process for producing an active material for positive electrodes of alkali batteries, comprising the following steps:

(1) supplying an aqueous solution of a nickel salt, an ammonium ion source and a solution of an alkali metal hydroxide into a reaction vessel;

(2) causing a continuous crystal growth of high-density nickel hydroxide;

(3) recovering the resultant nickel hydroxide particles and supplying them into another reaction vessel;

(4) adding an ammonium ion source and a solution of an alkali metal hydroxide and adjusting the pH to 8–11;

(5) adding an aqueous solution of a cobalt salt and a solution of an alkali metal hydroxide while maintaining the pH value, thereby forming an α-cobalt hydroxide coating layer on the surface of said nickel hydroxide particles; and (6) adding a solution of an alkali metal hydroxide to adjust the pH value to 11–13.5, thereby converting said α-cobalt hydroxide layer to a layer of β-cobalt hydroxide.

* * * * *

UNITED STATES PATENT AND TRADEMARK OFFICE
CERTIFICATE OF CORRECTION

PATENT NO. : 6,040,007
DATED : March 21, 2000
INVENTOR(S) : Junichi Imaizumi, Yuri Kawasaki; Tetsushi Makino; and Toyoshi IIDA It is certified that error appears in the above-identified patent and that said Letters Patent is hereby corrected as shown below:

On the Title Page:

Item [75] change "Imaizumi Junichi; Kawasaki Yuri; Makino Tetsushi; Iida Toyoshi" to --Junichi Imaizumi; Yuri Kawasaki; Tetsushi Makino; Toyoshi Iida--.

Signed and Sealed this

Third Day of April, 2001

Attest:

NICHOLAS P. GODICI

*Attesting Officer*　　　*Acting Director of the United States Patent and Trademark Office*